April 19, 1932. N. D. LEVIN 1,854,592

EQUALIZING MECHANISM

Filed May 29, 1930

Patented Apr. 19, 1932

1,854,592

UNITED STATES PATENT OFFICE

NILS D. LEVIN, OF COLUMBUS, OHIO, ASSIGNOR TO THE JEFFREY MANUFACTURING COMPANY, OF COLUMBUS, OHIO, A CORPORATION OF OHIO

EQUALIZING MECHANISM

Application filed May 29, 1930. Serial No. 457,382.

The present invention relates to equalizing mechanism. The mechanism is particularly intended for use upon wheeled vehicles, in order that, when such vehicle travels over an uneven trackway or bed, the load will be substantially uniformly distributed upon the supporting wheels by the action of the equalizing mechanism.

As here shown, the invention is applied to a locomotive of the type ordinarily used in coal mines, but it will be understood that this is illustrative, and that the invention is not restricted to any particular type of vehicle, but may be used wherever distribution of the load is desirable.

In the drawings herewith is shown one physical embodiment of my invention, and in the drawings:—

Figure 1 is a side elevation of a locomotive of the type referred to.

In the drawings, in which like numbers indicate like parts in the several views, 10 indicates the side frames of the mine locomotive, which may be of any suitable make-up, with the usual necessary adjuncts, but which, since they form no part of the present invention, need not be described in detail.

Figure 1:
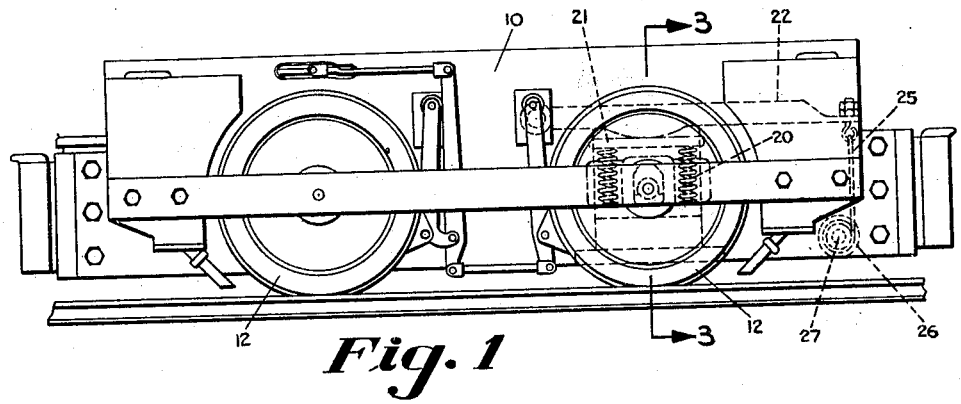

The vehicle is supported upon axles, here shown as provided with track wheels 12, designed to run upon the track rails shown, the particular form of vehicle here shown being of a type intended for use upon the usual mine tracks, although, as stated, the invention is applicable to types of vehicles other than the specific one here disclosed.

The axle 13 may be mounted in any suitable manner, and is here shown as journalled in axle boxes 14 which may slide vertically in guideways on the vehicle frame, there being provided, preferably, resilient means, as the springs 15 interposed between the axle box 14 and a suitable abutment 16.

The axle 17 will be mounted in vertically movable axle box 18 mounted in an aperture 19 in the side frame 10, and adapted to shift under the load as the vehicle travels over the trackway or road bed, there being provided resilient compressions means, as springs 20, between the flanges on the axle box 18 and an abutment member 21.

Figure 2:
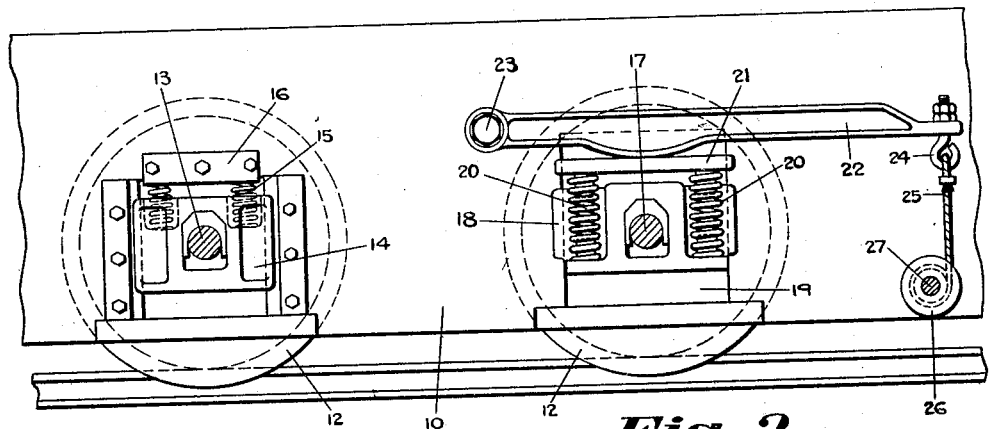
Figure 2 is an enlarged view of a portion of the vehicle with my invention applied thereto, taken substantially on the line 2—2 of Figure 3, looking in the direction of the arrows.
Figure 3:
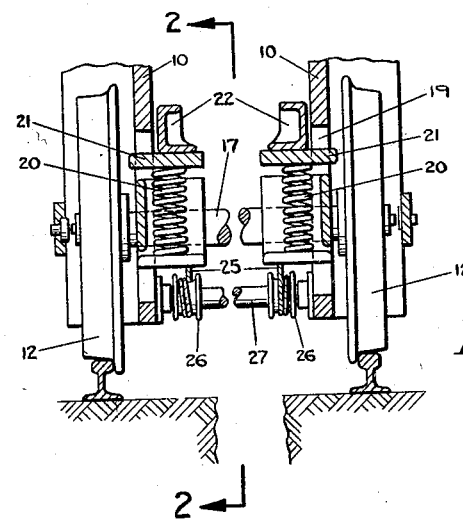
Figure 3 is a sectional view substantially on the line 3—3 of Figure 1, looking in the direction of the arrows, the parts being broken away for compactness of illustration.

The members 21 are slidable in the openings 19 in the side frames 10, being guided therein, as shown best in Figure 2, and serve to support equalizing levers 22 which have cam projections on their contact sides and are pivoted at 23 to the side frames 10 of the vehicle. The free ends of the levers 22 are provided with eye bolts or other suitable connecting means 24, to which are secured transmitting means, here shown as flexible ropes 25 which engage pulleys or sheaves 26 on a shaft 27, the connections 25, as will be observed from Figure 3, being reversely connected with the sheaves 26, so that when the shaft 27 is rotated in one direction or the other, the flexible connections 25 will be taken up or paid off at one side or the other, dependent on the direction of rotation of the shaft 27. The ends of the shaft 27 will be journalled in any suitable bearings in the side frames 10.

In operation, when the frame and axles move relative to each other, owing to irregularities in the trackway or road bed, the thrust of the axle box 18 upwardly against the lever 22 will swing the lever about its pivot, exert a pull on the connection 25, and rotate the sheaves 26 and the shaft 27. This will cause a corresponding movement of the lever 22 on the opposite side of the frame in an opposite direction, so as to effect a compensating action and uniform distribution of the load.

It will be seen that the axle 27 and its sheaves 26 constitute a torsion member which will transmit very effectively and without any appreciable loss, the movements of the parts relative to each other on one side to the mechanism on the other side of the vehicle in like proportion, but in opposite directions.

The construction here shown may, of course, be varied within the range of mechanical skill and still be within the purview of my invention.

I claim:

1. Equalizing mechanism comprising, in combination, a frame, relatively movable transporting means for said frame, a torsion member mounted on said frame, and flexible means operating under tension connecting said torsion member with said relatively movable transporting means to actuate said member and transmit equalizing movements to the opposite side of the frame.

2. Equalizing mechanism comprising, in combination, a frame, relatively movable transporting means for said frame, a torsion member mounted on said frame, and a cable connecting said torsion member with said relatively movable transporting means to actuate said member and transmit equalizing movements to the opposite side of said frame.

3. Equalizing mechanism comprising, in combination, a frame, relatively movable transporting means for said frame, a rotatable member mounted in said frame, and means operating under tension connnecting said rotatable member with said relatively movable transporting means to actuate said member and transmit equalizing movements to the opposite side of said frame.

4. Equalizing mechanism comprising, in combination, a frame, relatively movable transporting means for said frame, a rotatable shaft mounted in said frame, and flexible means operating under tension connecting said rotatable shaft with said relatively movable transporting means to actuate said shaft and transmit equalizing movements to the opposite side of said frame.

5. Equalizing mechanism comprising, in combination, a frame, relatively movable transporting means for said frame, a rotatable shaft mounted on said frame, a sheave on said shaft, and flexible means connecting said sheave with said relatively movable transporting means to actuate said shaft and transmit equalizing movements to the opposite side of said frame.

6. Equalizing mechanism comprising, in combination, a frame, relatively movable transporting means for said frame, a torsion member mounted on said frame, an equalizing lever responsive to relative movements of said frame and transporting means, and flexible connecting means between said lever and said torsion member to actuate said member and transmit equalizing movements to the opposite side of said frame.

7. Equalizing mechanism comprising, in combination, a frame, relatively movable transporting means for said frame, a torsion member mounted on said frame, a pivoted equalizing lever responsive to relative movements of said frame and said transporting means, and flexible connecting means between said lever and said torsion member to actuate said member and transmit equalizing movements to the opposite side of said frame.

8. Equalizing mechanism comprising, in combination, a frame, relatively movable transporting means for said frame, a torsion member mounted on said frame, an equalizing lever pivoted on said frame and responsive to relative movements of said frame and said transporting means, and flexible connecting means between said lever and said torsion member to actuate said member and transmit equalizing movements to the opposite side of said frame.

9. Equalizing mechanism comprising, in combination, a frame, relatively movable transporting means for said frame, a rotatable shaft mounted on said frame, an equalizing lever responsive to relative movements of said frame and said transporting means, and flexible connecting means between said lever and said rotatable shaft to actuate said shaft and transmit equalizing movements to the opposite side of said frame.

10. Equalizing mechanism comprising, in combination, a frame, relatively movable transporting means for said frame, a rotatable shaft mounted on said frame, a pivoted equalizing lever responsive to relative movements of said frame and said transporting means, and flexible connecting means between said lever and said rotatable shaft to actuate said shaft and transmit equalizing movements to the opposite side of said frame.

11. Equalizing mechanism comprising, in combination, a frame, relatively movable transporting means for said frame, a rotatable shaft mounted on said frame, an equalizing lever pivoted on said frame and responsive to relative movements of said frame and said transporting means, and flexible connecting means between said lever and said rotatable shaft to actuate said shaft and transmit equalizing movements to the opposite side of said frame.

12. Equalizing mechanism comprising, in combination, a frame, relatively movable transporting means for said frame, a rotatable shaft mounted on said frame, a sheave on said shaft, an equalizing lever pivoted on said frame and responsive to relative movements of said frame and said transporting means, and a cable connecting said lever and said sheave to actuate said rotatable shaft and transmit equalizing movements to the opposite side of said frame.

13. Equalizing mechanism comprising, in combination, a frame, relatively movable transporting means for said frame, a torsion member mounted on said frame and means under tension connecting said torsion member with said relatively movable transporting means to actuate said member and transmit equalizing movements to the opposite side of said frame.

In testimony whereof I have hereunto set my hand.

NILS D. LEVIN.